(12) United States Patent
Omokawa (10) Patent No.: US 6,511,565 B2
(45) Date of Patent: Jan. 28, 2003

(54) METHOD OF MAKING GREEN TIRE

(75) Inventor: Toshihiko Omokawa, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 39 days.

(21) Appl. No.: 09/809,313

(22) Filed: Mar. 16, 2001

(65) Prior Publication Data

US 2001/0039993 A1 Nov. 15, 2001

(30) Foreign Application Priority Data

Mar. 17, 2000 (JP) .......................................... 2000-76727

(51) Int. Cl.$^7$ .......................... B29D 30/26; B29D 30/32
(52) U.S. Cl. .................... 156/130.7; 156/131; 156/132; 156/133; 156/398; 156/421.6
(58) Field of Search ................................. 156/131, 132, 156/133, 130.7, 414, 400–402, 398, 421.4, 421.6, 403, 135

(56) References Cited

U.S. PATENT DOCUMENTS

| 2,313,035 | A |   | 3/1943 | Breth |         |
|-----------|---|---|--------|-------|---------|
| 3,438,832 | A | * | 4/1969 | Cantarutti | 156/401 |
| 3,503,829 | A | * | 3/1970 | Menell et al. | 156/401 |
| 3,862,871 | A | * | 1/1975 | Held et al. | 156/133 |
| 4,063,987 | A |   | 12/1977 | Irie et al. |         |
| 4,302,274 | A |   | 11/1981 | Enders |         |
| 4,353,771 | A | * | 10/1982 | Yuhas | 156/403 |

FOREIGN PATENT DOCUMENTS

| DE | 17 78 224 A |   | 8/1971 |
| EP | 1075930 A2 | * | 2/2001 |
| JP | 9-131807 A | * | 5/1997 |

* cited by examiner

*Primary Examiner*—Geoffrey L. Knable
(74) *Attorney, Agent, or Firm*—Birch, Stewart, Kolasch & Birch, LLP (57) ABSTRACT

A method of making a green tire comprises: winding a carcass ply of rubberized cords around a building drum into a substantially cylindrical body; pressing the cylindrical body against the building drum through the entire circumference not to allow the carcass cords to move axially and circumferentially of the drum; constricting edge portions of the substantially cylindrical body so that the outer diameter thereof is decreased; setting a bead core around each of the constricted edge portions; folding back the edge portions around the bead cores; releasing the cylindrical body from the pressing against the building drum after the edge portions are constricted at the earliest; and swelling a main portion of the cylindrical body between the bead cores while decreasing the width between the bead cores.

9 Claims, 7 Drawing Sheets

Fig.5A late — early

Fig.5B weak — strong

Fig.5C wide — narrow

Fig.6

METHOD OF MAKING GREEN TIRE

The present invention relates to a method of making a green tire being capable of improving tire uniformity by decreasing a variation of the carcass cord lengths.

In general, in the manufacture of pneumatic tires, in order to make a green tire, an inner liner of gas-impermeable rubber, one or more strips of rubberized cords for a carcass ply, reinforcing layer, etc. are wound on a building drum. The elastomers used in such rubber material and rubberized materials are not yet vulcanized when wound around the building drum. Therefore, their own adhesiveness is utilized to fix these materials onto the drum. As to the unvulcanized carcass ply material, it is first wound into a substantially cylindrical shape, and then the shape is gradually changed to the finished shape or a troidal shape. In this process, if disarrangement of carcass cords is caused, the carcass cord lengths between the bead cores in the finished tire are varied because the carcass cords' paths are varied. Even if the variation is small, under high-speed running conditions in particular, deterioration in tire uniformity such as radial run-out becomes not ignorable.

It is therefore, an object of the present invention to provide a method of making a green tire, in which disarrangement of the carcass cords is prevented so that the carcass cords' paths become constant and thereby the deterioration in the tire uniformity due to the cord path variation can be avoided.

According to the present invention, in method of making a green tire comprises winding a carcass ply of rubberized cords around a building drum into a substantially cylindrical body, pressing the cylindrical body against the building drum through the entire circumference not to allow the carcass cords to move axially and circumferentially of the drum, constricting edge portions of the substantially cylindrical body so that the outer diameter thereof is decreased, setting a bead core around each of the constricted edge portions, folding back the edge portions around the bead cores, swelling a main portion of the cylindrical body between the bead cores while decreasing the width between the bead cores.

An embodiment of the present invention will now be described in detail in conjunction with the accompanying drawings.

According to the present invention, a building drum 1 is used to make a green tire.

The building drum 1 has an outer surface 1S on which unvulcanized sheet-like tire components are wound. The sheet-like tire components (a) include at least one carcass ply and usually an inner liner rubber and optionally a reinforcing layer.

The outer surface 1S is a cylindrically curved circumferential surface. Thus, in a cross section including the axis of the drum, the surface 1S is substantially straight and parallel with the axis.

Figure 2:
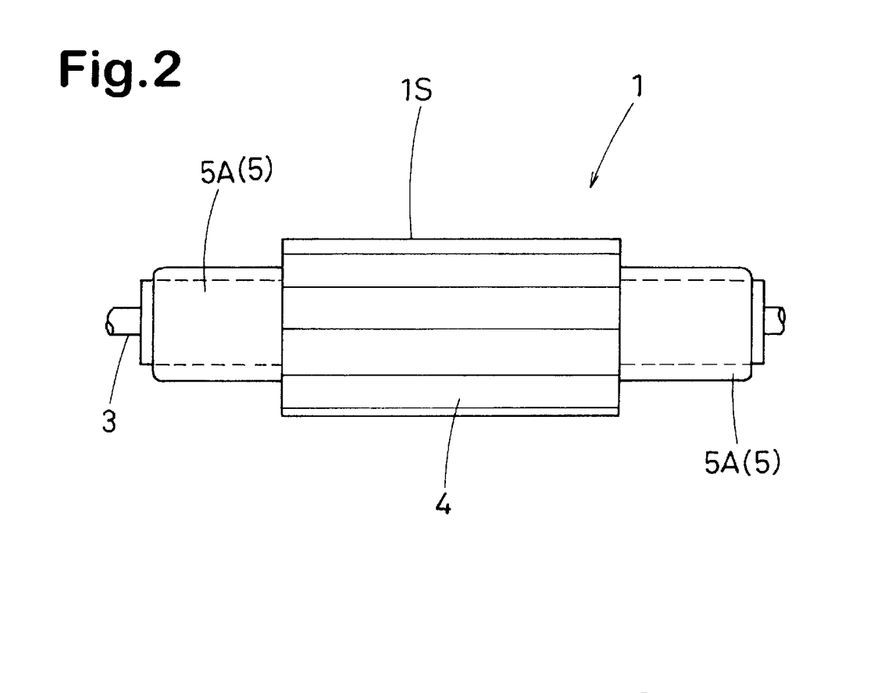
FIG. 2 is a diagram showing an example of the building drum.

An example of the building drum 1 is schematically shown in FIG. 2, which comprises a plurality of circumferentially divided sectors 4 which are arranged around the axis of the drum 1. The sectors 4 collectively form the above-mentioned cylindrical outer surface 1S at their radially outer positions. In order to contract the drum, the sectors 4 can move from the above-mentioned outer positions to inner positions. The building drum 1 is supported rotatably around the axis by a shaft 3.

In the normal or expanded state of the drum in which the sectors 4 are at the radially outer positions, the tire components (a) are wound into a cylindrical body (A) on the outer surface 1S, while rotating the building drum 1 relatively to feeders for the components. The winding can be done by (i) applying the components one on the outside of the other, or (ii) first making a laminated sheet of the components and then applying the laminated sheet on the drum, or (iii) combination of (i) and (ii).

For example, in case (i), firstly the inner liner rubber is wound on the drum, and then the carcass ply is wound on the inner liner. In case (ii), firstly the inner liner rubber and the carcass ply thereon are laminated into a sheet, and then the laminated sheet is wound on the drum. In case (iii), of course at least three sheet-like components are used, for example, an inner liner and a carcass ply which are laminated into a sheet, and another carcass ply or a reinforcing layer wound on the laminated sheet.

The cylindrical body (A) is wider than the outer surface 1S, and as a result, it has a main portion A1 on the outer surface 1S and edge portions A2 which protrude from the respective edges of the outer surface 1S.

Figure 1A:
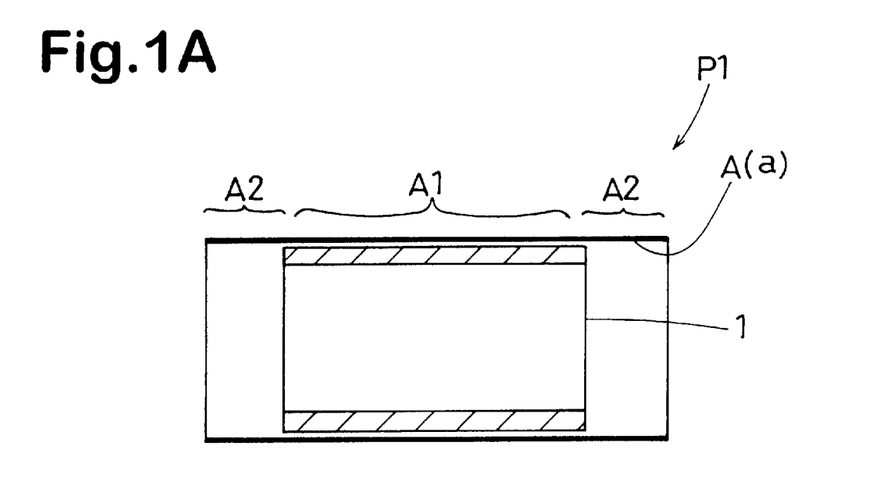
FIGS. 1A, 1B, 1C, 1D, 1E and 1F are diagrams for explaining an example of the method of making a green tire according to the present invention.

FIG. 1A shows such cylindrical body (A) formed on the building drum 1, while protruding the edge portions A2.

Figure 1B:
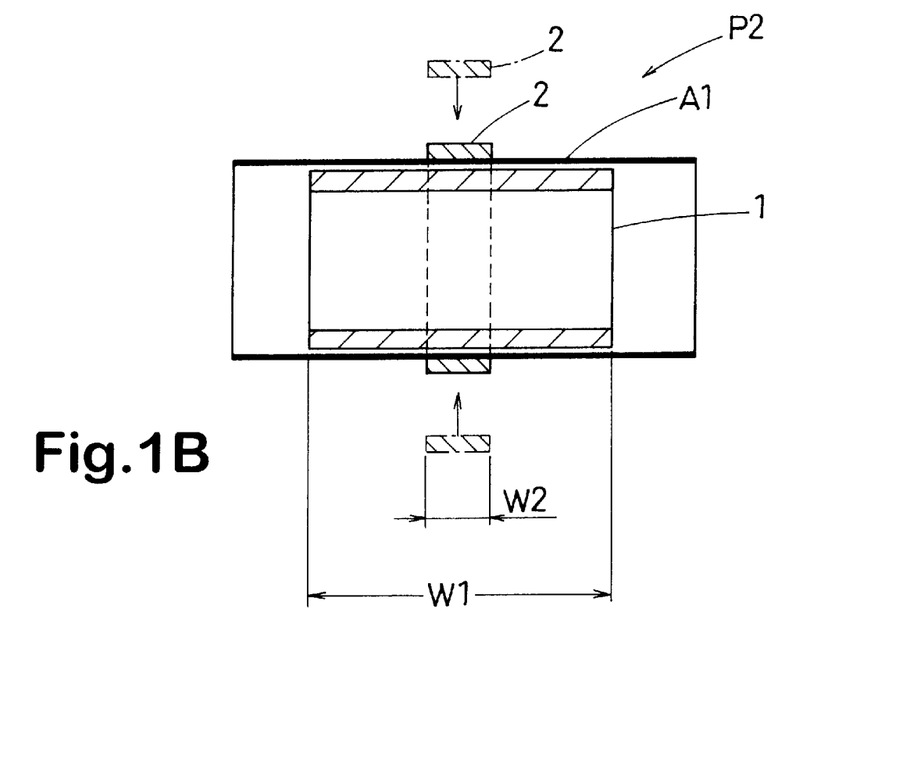

Next, as shown in FIG. 1B, the cylindrical body (A) is secured by a holding apparatus 2 not to allow the carcass cords therein to move axially and circumferentially of the drum.

The holding apparatus 2 presses the main portion A1 against the outer surface 1S of the building drum 1 through the entire circumference in order to prevent the. carcass cords from being moved.

Figure 3:
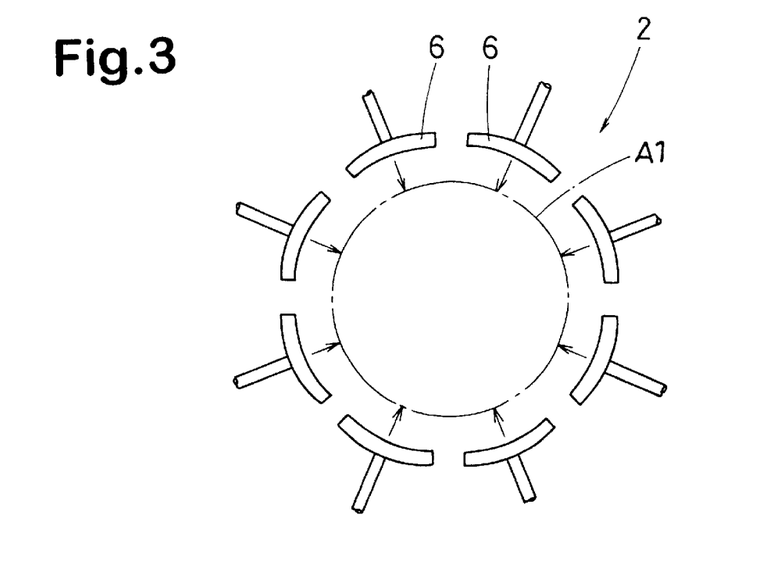
FIG. 3 is a diagram for explaining an example of the holding apparatus for the cylindrical body.

An example of the holding apparatus 2 is schematically shown in FIG. 3, wherein a plurality of profiled presser plates 6 are arranged around the building drum 1. The presser plates 6 can move towards the axis of the building drum 1 to press the main portion A1 against the drum. Preferably, the presser plates 6 are staggered about a circumferential line for example the center line of the main portion A1 so as to be able to overlap each other in the pressing state thus not to form a circumferential gap between them.

To ensure the prevention of the carcass cord movement in the main portion A1, the pressing or holding width W2 by the holding apparatus 2 is preferably set in a range of not less than 0.3 times the width W1 of the main portion A1.

As to the pressing position in the axial direction of the drum, in case of a single position as shown in FIG. 1B, the center of the main portion A1 is preferred. In case of two positions (not shown), near the edges of the main portion A1 are preferred. Of course, three or more positions are also possible.

Next, in order to set a bead core C around each of the edge portions A2, the outside diameter of the edge portions A2 is decreased by a constrictor F because the outside diameter is still more than the inside diameter of the bead core C.

In the normal or expanded state of the building drum 1, the outside diameter thereof is more than the inside diameter of the bead core C, and accordingly, the outside diameter of the cylindrical body (A) wound on the drum is also more than the inside diameter of the bead core C.

Figure 4:
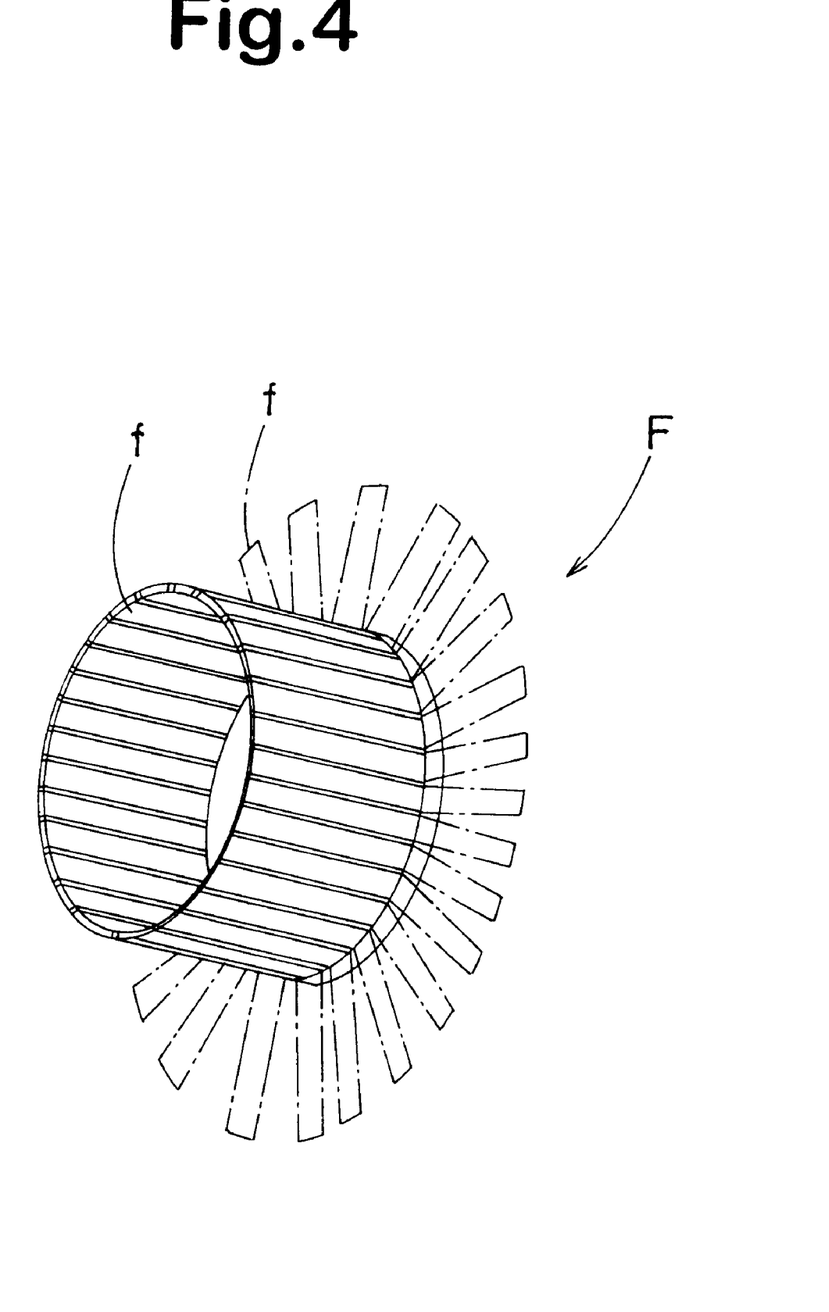
FIG. 4 is a schematic perspective view of an example of the constrictor for the edge portions of the cylindrical body.

An example of the constrictor F is shown in FIG. 4, which comprises a plurality of narrow width flat springs (f) one end of which is pivoted movably from a radial state to a parallel state. In the radial state, as depicted with an imaginary line, the longitudinal directions of the flat springs (f) are radial about the drum's axis. In the parallel state, as depicted with a solid line, the longitudinal directions are parallel to the drum's axis.

Figure 1C:
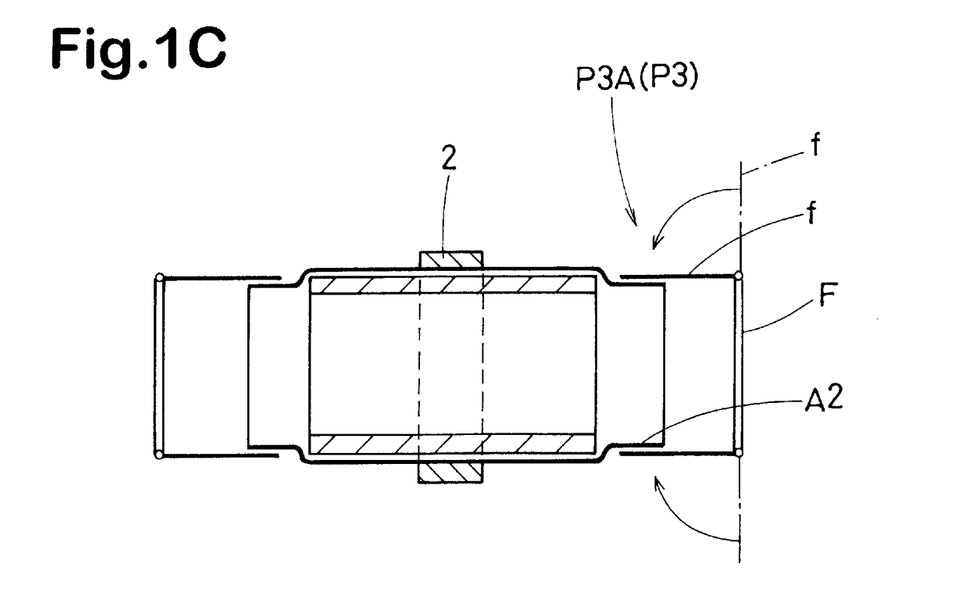

As shown in FIG. 1C, the constrictor F in the radial state is disposed on each side of the drum coaxially therewith, and then the flat springs (f) are gradually moved towards the parallel state. Therefore, the outer surface of the edge portions A2 is compressed by the flat springs (f), and the outside diameter of the edge portions A2 becomes less than the-inside diameter of the bead core C.

Figure 1D:
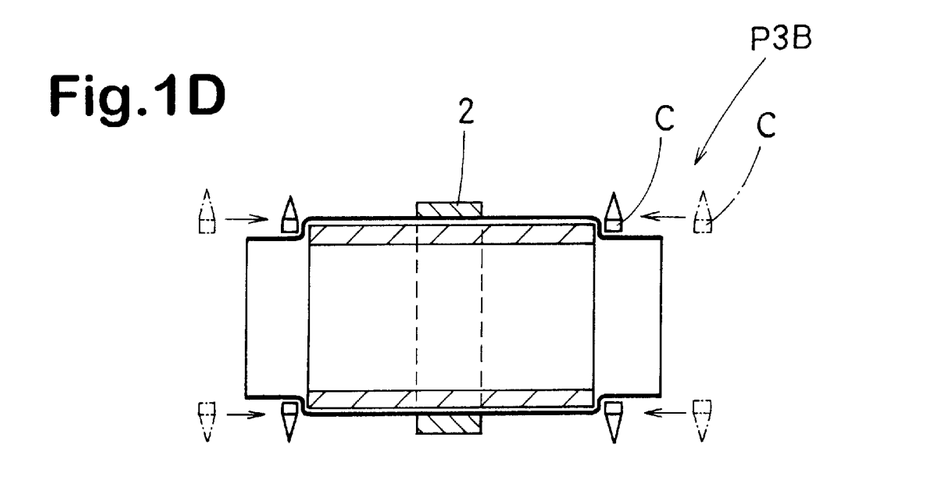

Next, as shown in FIG. 1D, the bead cores C are moved to the respective positions on the edge portions A2 from the sideways so that the bead cores C are located adjacently to the axial edges of the main portion A1.

In this example, each bead core C and-an unvulcanized bead apex rubber having a triangular sectional shape are assembled in advance by adhering the apex rubber onto the outer circumferential surface of the bead core C.

Figure 1E:
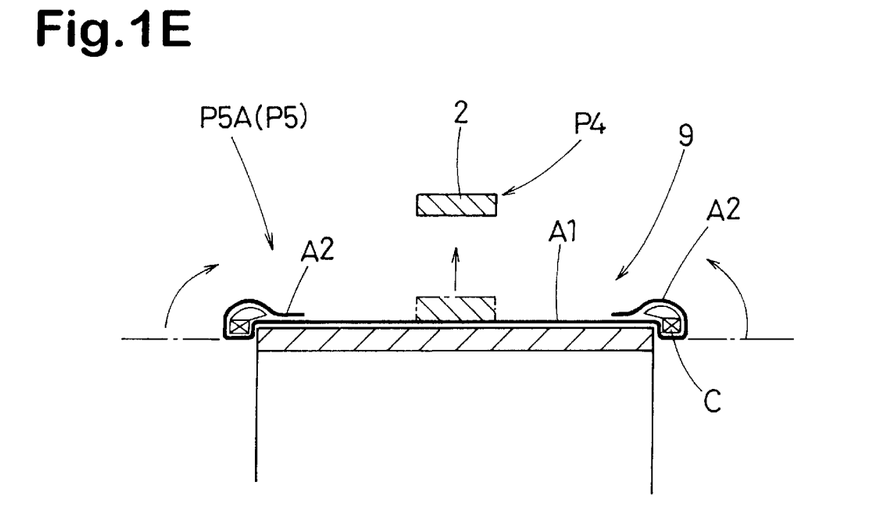
Figure 1F:
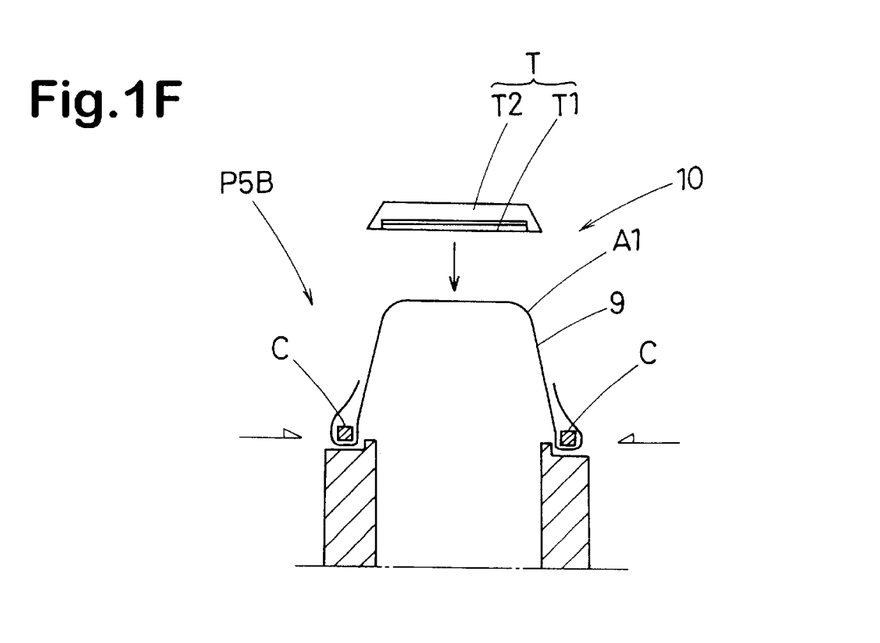

After the bead cores are set, as shown in FIG. 1E, each of the edge portions A2 is folded back around the bead core C and bead apex, using a folding apparatus 5. Further, as shown in FIG. 1F, the main portion A1 is swelled while decreasing the width between the bead cores C, and then tread components T including a tread reinforcing belt T1, a tread rubber T2, etc. are applied to the crown portion of the expanded main portion A1. Also, rubber layers for tire sidewall, bead and the like-are applied at appropriate times.

Thus, a green tire is formed, and it: is put in a mold and vulcanized into the finished shape.

As to the time sequence of the folding back of the edge portions and the applying of the tread components, they can be done almost simultaneously as well as in a sequence of the above order.

As an example of the folding apparatus 5, a bladder 5A can be used. The bladder 5A is disposed on each side of the building drum 1 in its deflated sate such that a part thereof is put in the open end of the cylindrical body. By the inflation of the bladder 5A, the edge portion is pressed by the inflating bladder and folded.

Incidentally, to detach the tire materials wound on the building drum 1 therefrom, the drum 1 has to contract such that its outside diameter becomes less than the smallest inside diameters of the wound materials which occurs under the bead cores.

The releasing of the main portion A1 from the pressing force by the holding apparatus 2 must be done after the constriction of the edge portions A2 by the constrictor F is finished. Preferably, the releasing is done after the bead cores are set at the earliest. Also it is possible to release the main portion A1 after the edge portions A2 are folded.

Figure 5A:
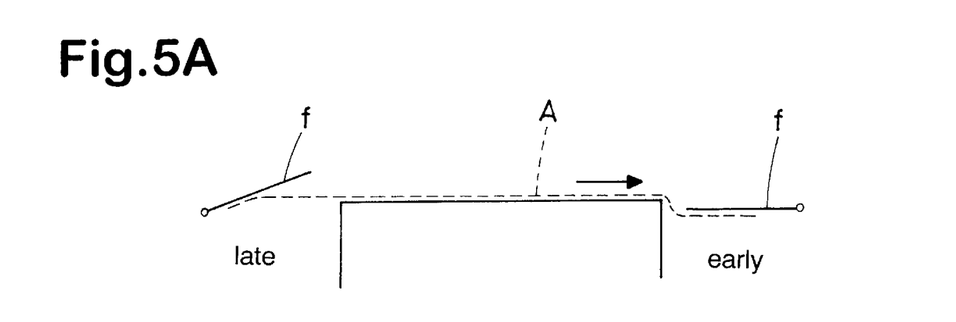
FIGS. 5A, 5B and 5C are diagrams for explaining a problem in constricting the edge portions of the cylindrical body.
Figure 5B:
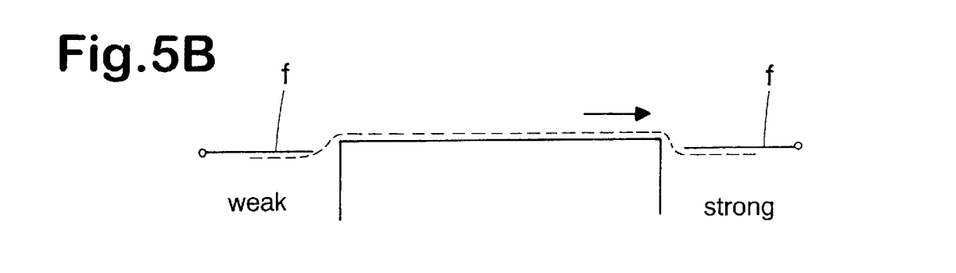
Figure 5C:
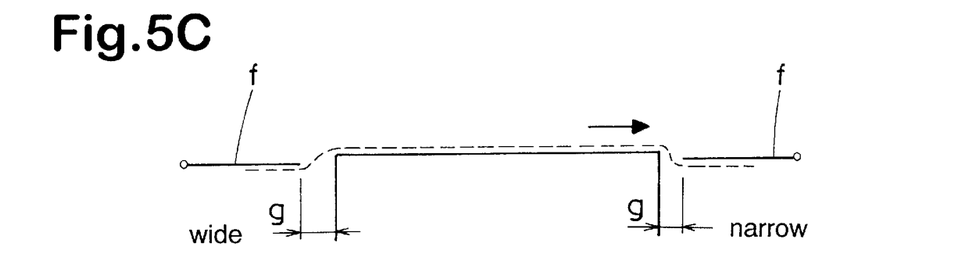
Figure 6:
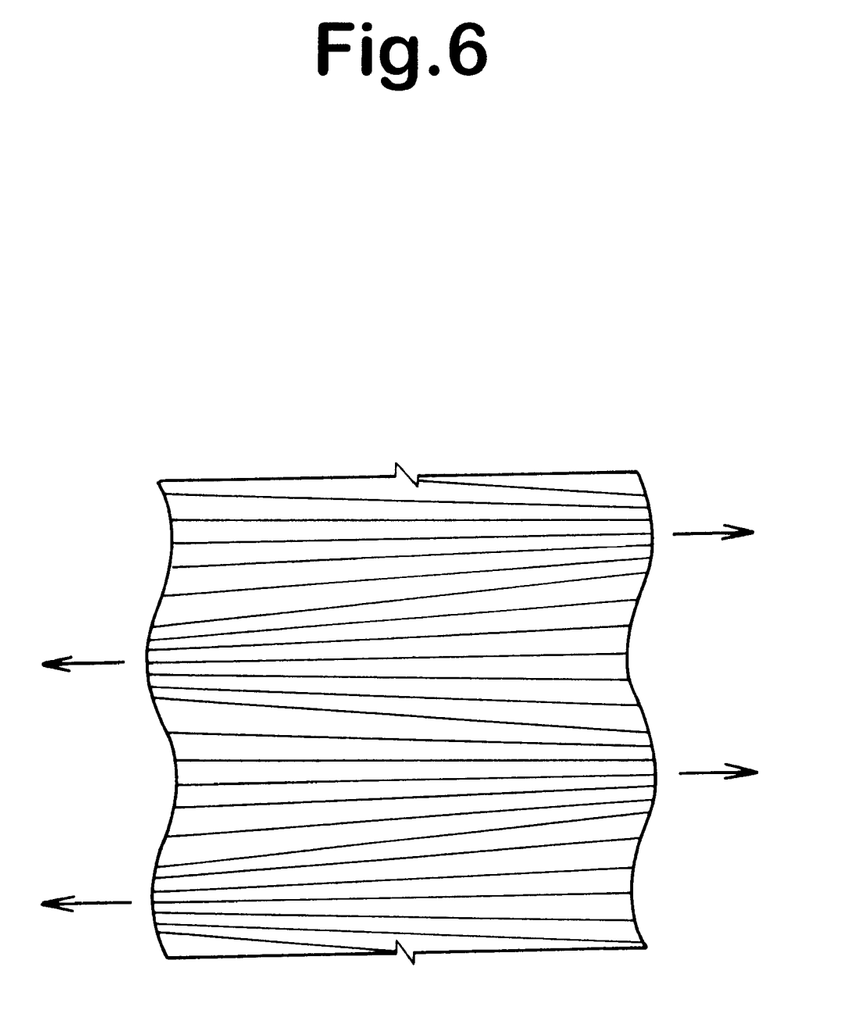
FIG. 6 shows a resultant disarray causing variation of the carcass cord paths.

If the main portion A1 (or the carcass cords therein) is not secured to the drum 1, there is a possibility that some of the carcass cords are pulled towards a direction as shown in FIGS. 5A, 5B and 5C by arrows when the constricting starts earlier on one side than the other side (FIG. 5A), the constriction is stronger on one side than the other side (FIG. 5B), and the gap (g) between the drum and constrictor is narrower on one side than the other side (FIG. 5C). At the worst, such cord pulling occurs on both sides alternately in the circumferential direction, and the carcass cords are disarranged as shown in FIG. 6. According to the present invention, such disarrangement can be effectively prevented.

Comparison Tests

Radial tires of size 195/65R15 for passenger cars were experimentally made according to the present invention. And the length of the carcass cord path between the bead cores was measured at eight circumferentially different positions, and the mean deviation and standard deviation were calculated from those data. Further, the radial force variation was measured according to JASO C607 (Test method for automobile tire uniformity) to obtain the mean value and standard deviation of ten sample tires.

The test results are shown in the following Table 1.

TABLE 1

| Tire | Ref. | Ex. |
| --- | --- | --- |
| Carcass cord path | | |
| Mean deviation (mm) | 2 | 1 |
| Standard deviation (mm) | 1.5 | 0.5 |
| RFV | | |
| Mean value (N) | 63.7 | 48 |
| Standard deviation (N) | 17.6 | 7.8 |

From the test results, it was confirmed that the tires made according to the present invention can be effectively improved in the uniformity.

What is claimed is:

1. A method of making a green tire comprising
    winding a carcass ply of rubberized cords around a building drum into a substantially cylindrical body,
    pressing the cylindrical body against the building drum through the entire circumference not to allow the carcass cords to move axially and circumferentially of the drum,
    constricting edge portions of the substantially cylindrical body so that the outer diameter thereof is decreased,
    setting a bead core around each of the constricted edge portions,
    folding back the edge portions around the bead cores,
    releasing the cylindrical body from the pressing against the building drum after the edge portions are constricted at the earliest,
    swelling a main portion of the cylindrical body between the bead cores while decreasing the width between the bead cores.

2. The method according to claim 1, wherein
    the carcass ply is wound directly or indirectly on a substantially cylindrical outer surface of the building drum, and
    the substantially cylindrical outer surface is narrower in axial width than the substantially cylindrical body and the edge portions to be constricted protrude from the axial edges of the substantially cylindrical outer surface of the drum.

3. The method according to claim 1, wherein
    the pressing of the cylindrical body against the building drum is done by an apparatus which comprises presser plates arranged around the building drum movably towards the axis of the drum to press the substantially cylindrical body.

4. The method according to claim 3, wherein the presser plates are staggered about a circumferential line so that the presser plates overlap each other when pressing the cylindrical body.

5. The method according to claim 1, wherein the constricting of the edge portions is done by a device which comprises a plurality of narrow width flat springs one end of which is pivoted movably from a radial state to a parallel state, in the radial state, the longitudinal directions of the flat springs are radial about the drum's axis, in the parallel state, the longitudinal directions are parallel to the drum's axis, and by the motion of the flat springs from the radial state to the parallel state, the edge portion is constricted.

6. The method according to claim 1, wherein the folding back of each of the edge-portions is done by inflation of a bladder disposed on each side of the building drum.

7. The method according to claim 1, wherein the releasing of the cylindrical body from the pressing against the building drum is done after the bead cores are set.

8. The method according to claim 1, wherein the releasing of the cylindrical body from the pressing against the building drum is done after the edge portions are folded back.

9. The method according to claim 1, wherein after the main portion of the cylindrical body is reached to a certain diameter by the swelling, a tread rubber is disposed around a crown portion thereof.

* * * * *